(12) United States Patent
Pelletier

(10) Patent No.: US 6,539,638 B1
(45) Date of Patent: Apr. 1, 2003

(54) LINE PROJECTING DEVICE

(76) Inventor: Victor Pelletier, 552, rue Pelletier, St-Colomban P.Q. (CA), J0R 1N0

( * ) Notice: Subject to any disclaimer, the term of this patent is extended or adjusted under 35 U.S.C. 154(b) by 0 days.

(21) Appl. No.: 09/558,855

(22) Filed: Apr. 27, 2000

(51) Int. Cl.[7] .............................................. G01C 15/00
(52) U.S. Cl. ...................... 33/290; 33/227; 33/DIG. 21
(58) Field of Search .......................... 33/227, 290, 291, 33/292, DIG. 21

(56) References Cited

U.S. PATENT DOCUMENTS

| | | | |
|---|---|---|---|
| 3,820,903 A | | 6/1974 | Kindl et al. |
| 3,858,984 A | | 1/1975 | Denton et al. |
| 3,887,282 A | | 6/1975 | Hansen |
| 3,984,154 A | | 10/1976 | Chin et al. |
| 4,123,148 A | | 10/1978 | Laird |
| 4,699,186 A | * | 10/1987 | Palin et al. ............ 33/DIG. 21 |
| 5,594,993 A | | 1/1997 | Tager et al. |
| 5,836,081 A | * | 11/1998 | Orosz, Jr. ..................... 33/290 |
| 5,872,657 A | * | 2/1999 | Rando ........................... 33/291 |
| 5,983,510 A | * | 11/1999 | Wu et al. ...................... 33/227 |
| 6,065,217 A | * | 5/2000 | Dong ............................ 33/290 |
| 6,256,895 B1 | * | 7/2001 | Akers ........................... 33/290 |

* cited by examiner

Primary Examiner—G. Bradley Bennett

(57) ABSTRACT

The present invention concerns a line projecting device that can project a line spanning 360 degrees onto a working surface. The line projecting device preferably comprises two line projectors back to back and a leveling device. The leveling device is used to indicate the horizontal position of the line projectors, both being in a same plane. Each line projector consists in a source of light that can direct a collimated light beam on a transparent annular cylinder. A plurality of partial reflections and refractions of the light beam inside the cylinder create a line that spans over 360 degrees on working surfaces in the line of sight of the projector.

13 Claims, 5 Drawing Sheets

LINE PROJECTING DEVICE

FIELD OF THE INVENTION

The present invention relates to a line projecting device and more specifically to an optical system used in leveling and projecting a line on a working surface that spans over 360 degrees around the device.

BACKGROUND OF THE INVENTION

Levels are essential tools in many fields of activity whenever perfectly horizontal or vertical lines are required. The most commonly used level consists of a leveling device mounted on a straight support. A drawback of such a level is that it makes it difficult to simultaneously adjust the orientation of the support and draw a line, especially when that line intersects different surfaces. The length of the line that can be drawn is also limited to the length of the support.

A solution to this problem has been proposed in U.S. Pat. No. 3,897,637 granted on Aug. 5, 1975 to Genho, where an apparatus that can direct two perpendicular laser beams is described. The apparatus can be positioned, for example, in a corner of a room, to produce two perpendicular lines that can be used as references. A drawback of Genho's level is that, since the leveling lines are not projected but directly emitted from the apparatus, it is not possible to project the leveling lines directly on the surfaces where the work is to be done. Another drawback is that it can be difficult to produce a line near a remote plane such as a high ceiling.

U.S. Pat. No. 5,539,990 granted on Jul. 30, 1996 to Le describes a leveling instrument that overcomes the above-mentioned drawbacks by projecting lines instead of using directly the light beam produced. However, the mechanism used to project the line is complicated and fragile, therefore expensive. Moreover, since the projector is universally pendulously mounted, the leveling is done automatically, rendering it difficult to project lines having other angles than the one initially designed for.

Another example of optical leveling system is found in U.S. Pat. No. 3,984,154 granted on Oct. 5, 1976 to Chin et al. and entitled "Optical Fan Levelling System". In this patent the two cylindrical concentric reflective surfaces are bridged by an edge face that is expensive to manufacture, hence not permitting a line spanning over 360 degrees from the line projecting device. In the case where such a need would be required, one would have to move the "Optical Fan Levelling System", losing precious time, and possibly disturbing the leveling mechanism and setting. That 360 degree span is also limited by the fact that the light beam generator is in the same plane as the projected line thus providing partial obstruction that could possibly be avoided with an expensive arrangement of special and accurate mirrors.

OBJECTS OF THE INVENTION

It is therefore a general object of the present invention to provide a line projecting device of the character described which obviates the above noted disadvantages.

Another object of the present invention is to provide a line projecting device that allows a leveling light to be projected and spanning horizontally over a 360 degree sector around the line projecting device.

Another object of the present invention is to provide a line projecting device that can be easily mounted on a variety of leveling aid support which can be adjusted to give a projected and spanning light over a 360 degree sector around the line projecting device but at differently selected slanted planes.

A further object of the present invention is to provide a line projecting device that will not require frequent adjustments once properly set.

SUMMARY OF THE INVENTION

The present invention consists of a line projecting device for projecting a line on a working surface comprising:

a partially reflective and partially transparent cylindrical member with an optically smooth outer surface;

a source of collimated light to direct a light beam intersecting said cylindrical member in a radial plane and obliquely to said outer surface, said cylindrical member inducing multiple internal reflections and refractions of said beam on said outer surface for projection of said line onto said working surface, said line spanning over at least 60 degrees from said device;

a body member adapted to fixedly receive said cylindrical member and said light source in proper relative position.

Preferably, the cylindrical member further includes an optically smooth inner cylindrical surface generally concentric with said outer surface to form an essentially annular cross-section of said cylindrical member, both said inner and outer surfaces inducing multiple internal reflections and refractions of said beam.

Preferably, the line spans over at least 220 degrees from said device.

Preferably, the body member is adapted to fixedly receive, in proper relative position a plurality of additional partially reflective and partially transparent cylindrical member with each a respective additional optically smooth outer surface, and a respective additional source of collimated light to direct a respective additional light beam intersecting said respective additional cylindrical member in a respective additional radial plane and obliquely to said respective additional outer surface, said respective additional cylindrical member inducing multiple internal reflections and refractions of said beam on said respective additional outer surface for projection of a respective additional line onto said working surface, said respective additional radial plane being coplanar to said first radial plane, all of said cylindrical members and light sources being generally oriented in generally equally angularly spaced apart positions around a complete 360 degree angle within said radial planes to have all of said lines slightly overlapping each adjacent others and jointly spanning over 360 degrees from said device.

Alternatively, the body member is adapted to fixedly receive, in proper relative position a second partially reflective and partially transparent cylindrical member with a second optically smooth outer surface, and a second source of collimated light to direct a second light beam intersecting said second cylindrical member in a second radial plane and obliquely to said second outer surface, said second cylindrical member inducing multiple internal reflections and refractions of said beam on said second outer surface for projection of a second line onto said working surface, said second radial plane being coplanar to said first radial plane, said second cylindrical member and second light source being generally oriented 180 degrees from said first cylindrical member and first light source within said radial planes to have said first and second lines, each spanning over at least 220 degrees, slightly overlapping each other and jointly spanning over 360 degrees from said device.

Preferably, the first and second cylindrical members further includes, respectively, a first and second optically smooth inner cylindrical surface generally concentric with said respective outer surface to form an essentially annular cross-section of said respective cylindrical member with both said inner and outer surfaces inducing multiple internal reflections and refractions of said respective beam.

Preferably, the body member further includes a leveling device properly aligned with a preferred angle relative to said first and second radial planes.

Preferably, the preferred angle is zero so as to orient said first and second lines into a horizontal plane when said body member is maintained in a position with said leveling device indicating a horizontal leveling.

BRIEF DESCRIPTION OF THE DRAWINGS

In the annexed drawings, like reference characters indicate like elements throughout.

DETAILED DESCRIPTION OF THE PREFERRED EMBODIMENTS

Figure 1:
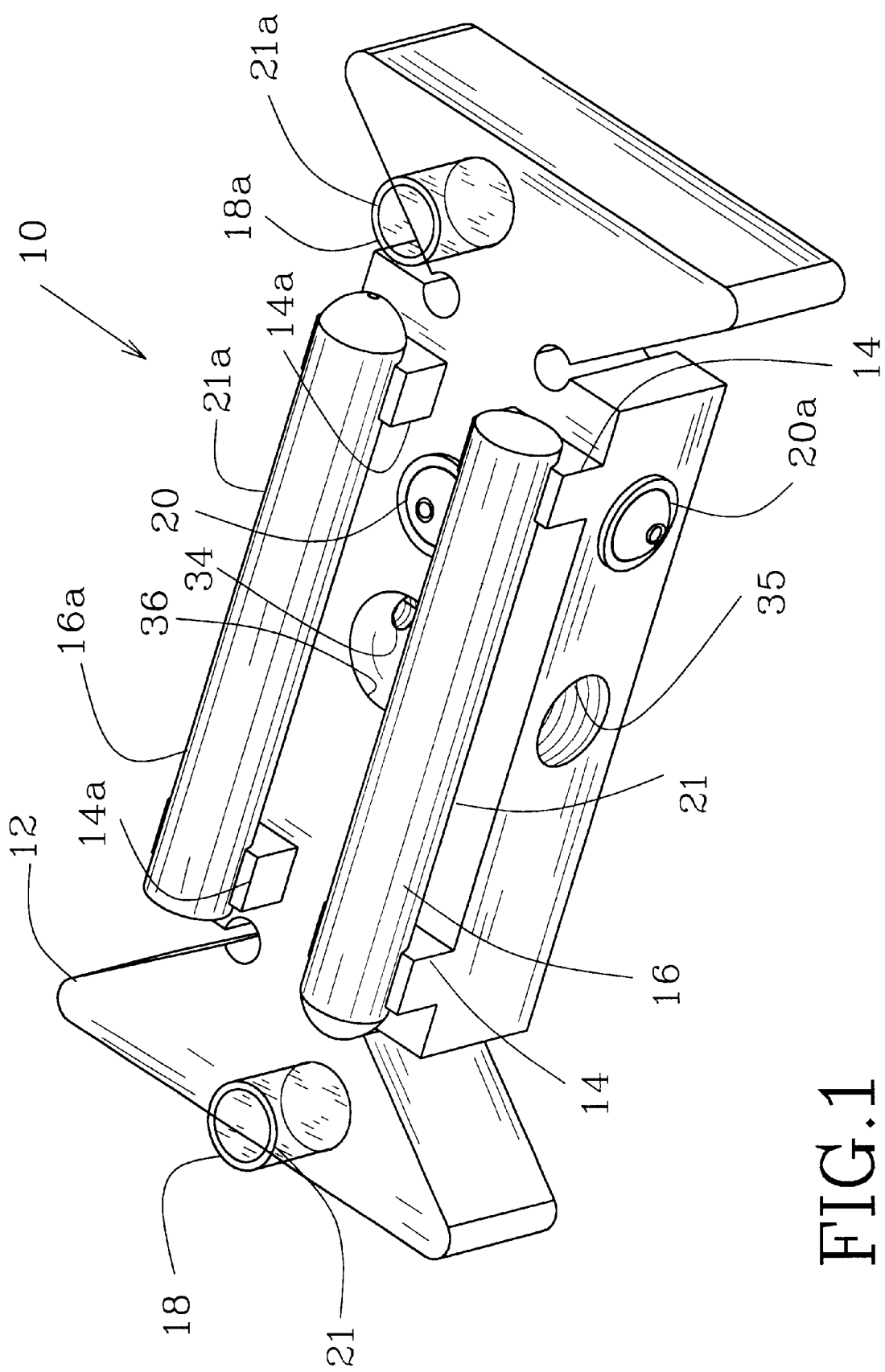
FIG. 1 is a perspective view showing an embodiment of a line projecting device according the present invention.

Referring to FIG. 1, there is shown a line projecting device 10 that includes a body member 12; a first and preferably second supports 14, 14a secured onto the body member 12; a first and second sources of collimated light 16, 16a, preferably standard lasers, mounted respectively on the first and second supports 14, 14a; a first and second cylindrical members 18, 18a each partially reflective and partially transparent and each secured on the body member 12; and a leveling device, preferably a horizontal plane level 20, also secured on the body member 12. First and second sources of collimated light 16, 16a and their corresponding first and second cylindrical members 18, 18a form the first and second line projectors 21, 21a respectively.

Figure 2:
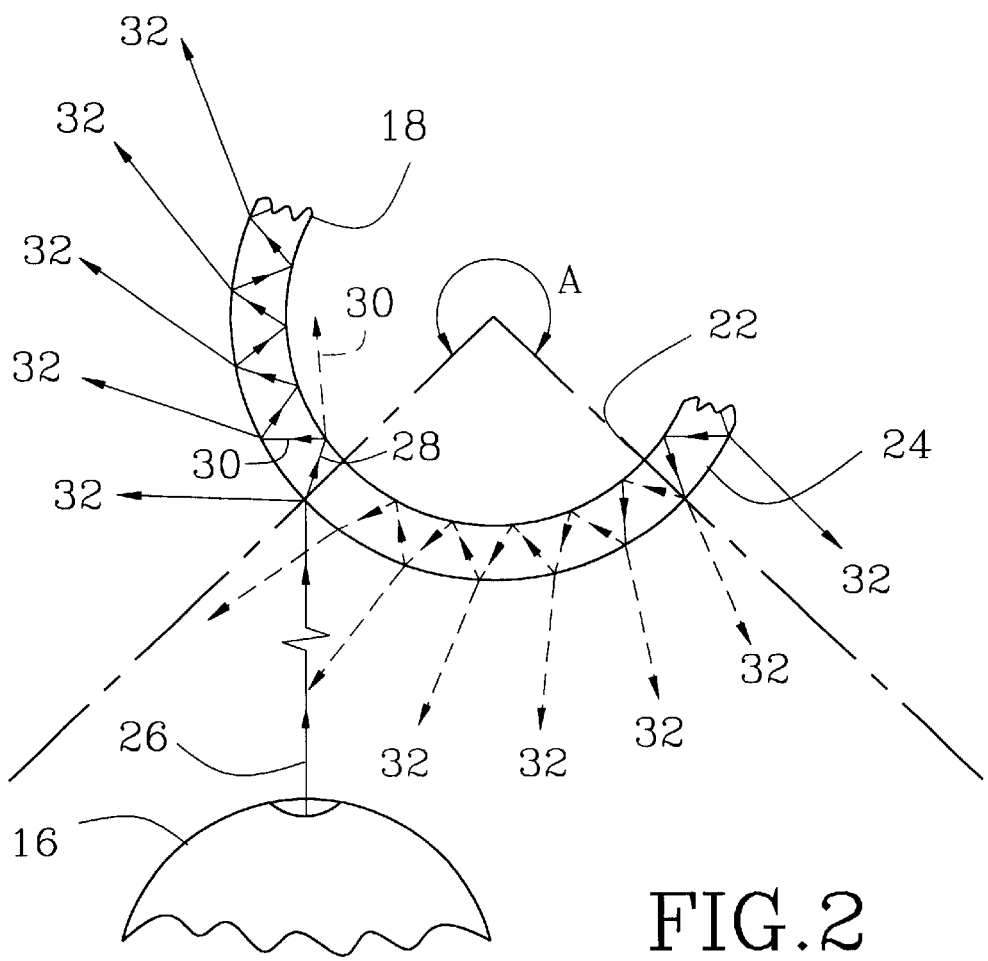
FIG. 2 is a schematic partially enlarged plan view showing how a collimated light beam is directed on the cylindrical member and some of the resulting partial reflection and refractions and the span covered by the beam.
Figure 3:
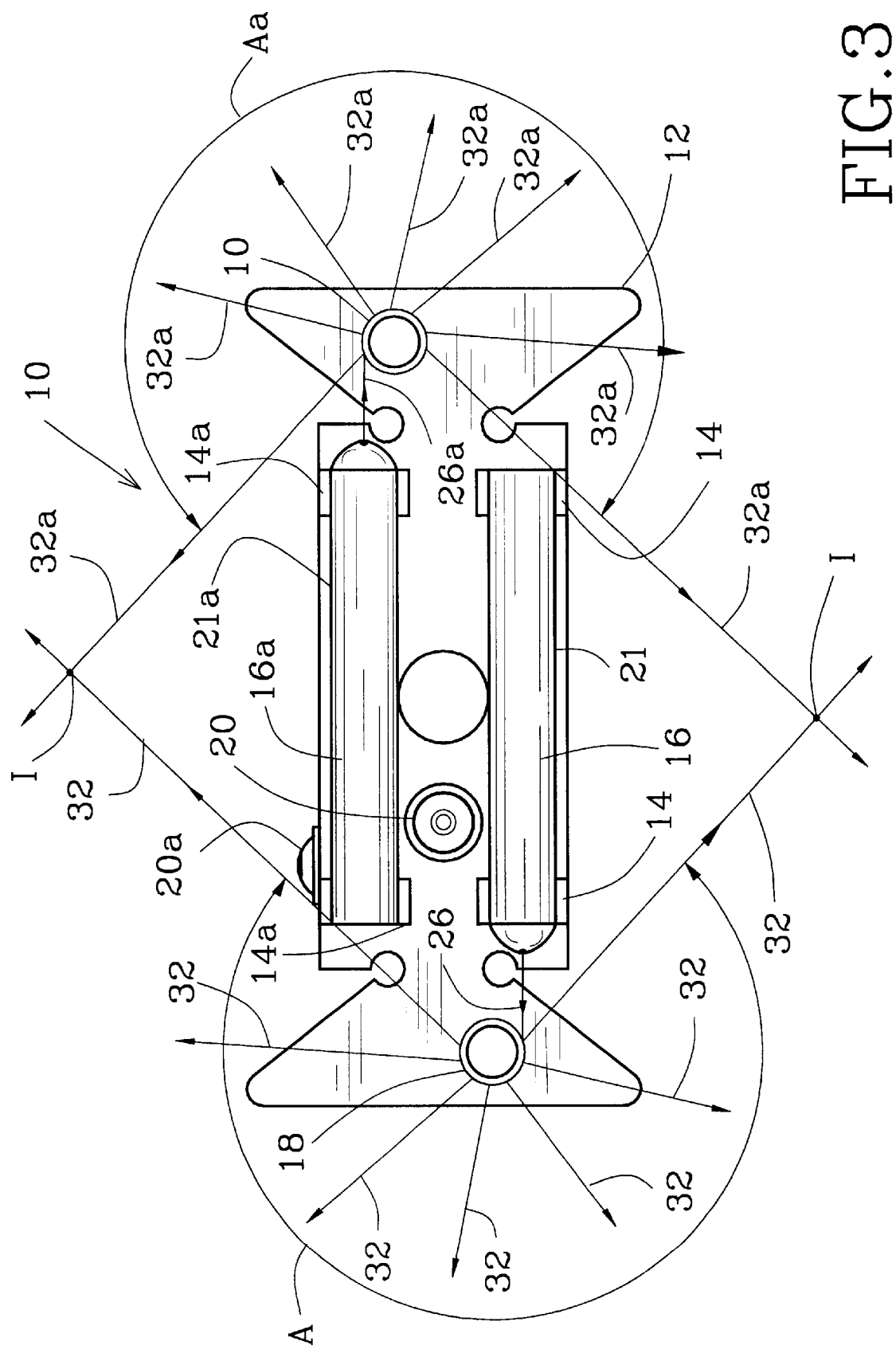
FIG. 3 is a plan view of the embodiment of FIG. 1 in operation and showing the overlapping span covered by the two projected lines.

Referring to FIGS. 2 and 3, the first cylindrical member 18 is such positioned with its axis essentially perpendicular to the body member 12. Preferably, a first inner surface 22 of the cylindrical member 18 is generally concentric with a first outer surface 24 of the cylindrical member 18, both forming an essentially annular cross-section of the cylindrical member 18. Both first inner and outer surfaces 22, 24 are optically cylindrical smooth surfaces. The first source of light 16 is positioned and calibrated to direct a first light beam 26 in a radial plane of the cylindrical member 18 and obliquely to the first outer surface 24 of the cylindrical member 18 to be refracted towards the inner surface 22 in such a way that the incident angle against the first inner surface 22 will be greater than the critical angle necessary in optical physics to induce at least partial (because of existing microscopic imperfections on inner surface 22) or total internal reflection of the first light beam 26, and in such a way that the internal reflected incident angle against the first outer surface 24 will be smaller than the critical angle necessary in optical physics to induce partial internal reflection and partial refraction of the first light beam 26 through the interface. The first light beam 26 upon contact with the first outer surface 24 is refracted to give the first refracted ray 28. The latter is then partially internally reflected as explained above against the first inner surface 22 and becomes the first reflected ray 30. The latter is then partially internally reflected against the first outer surface 24 and partially outwardly refracted as explained above to give respectively another internally reflected ray 30 and a outwardly refracted ray 32, and so on going all around the cylindrical member 18 at least once (as shown in dotted lines on FIG. 2). The first refracted ray 28 may also become a partially refracted ray 30' inwardly from the inner surface 22 to itself re-induce multiple reflected and refracted rays, all in the same radial plane. The angles of the rays of light shown on FIGS. 2 and 3 are illustrative only, the partially internally reflected and outwardly refracted angles of the rays of light are in reality in a much smaller scale, and induce multiple reflected rays 30 and refracted rays 32. A first resulting angle A of the span covered by the line L formed by the first refracted rays 32 is preferably of at least 220 degree span. It would be understood by any person skilled in the art that, practically, the angle A may vary anywhere between 60 and 300 degrees, preferably of about 220 degrees, depending on the intensity of the beam 26, the transparency of the cylindrical member 18 material and the blockage induced by the source of collimated light 16.

Here, the term "partially" is essentially used since the first light beam 26 is of a certain diameter and will therefore hit the non-perfect outer surface 24 and subsequently the non-perfect inner surface 22 at a multitude of different angles over the spread of its diameter (of the beam 26); as opposed to perfectly theoretical ray hitting perfectly smooth surfaces. Note that the inner surface 22 can be coated with a highly reflective coating that would improve the internal reflections on that surface.

Also shown is a similar second light beam 26a directed by the second source of light 16a, a similar second refracted ray 28a, multiple similar partially internally reflected rays 30a, multiple similar partially outwardly refracted rays 32a, a similar optically smooth second inner surface 22a and a similar optically smooth second outer surface 24a of the second cylindrical member 18a, and a similar second resulting angle Aa of the span covered by the line La formed by the second refracted rays 32a of at least 220 degree span, preferably.

The first and second line projectors 21, 21a are preferably oriented 180 degrees from each other (back to back), in a parallel but opposite direction.

Resulting intersections 1 between the first resulting angle A and the second resulting angle Aa give an overlapping of the first and second lines L, La respectively to give a combined angle formed by the latter two covering the complete 360 degrees around the line projecting device 10.

Figure 4:
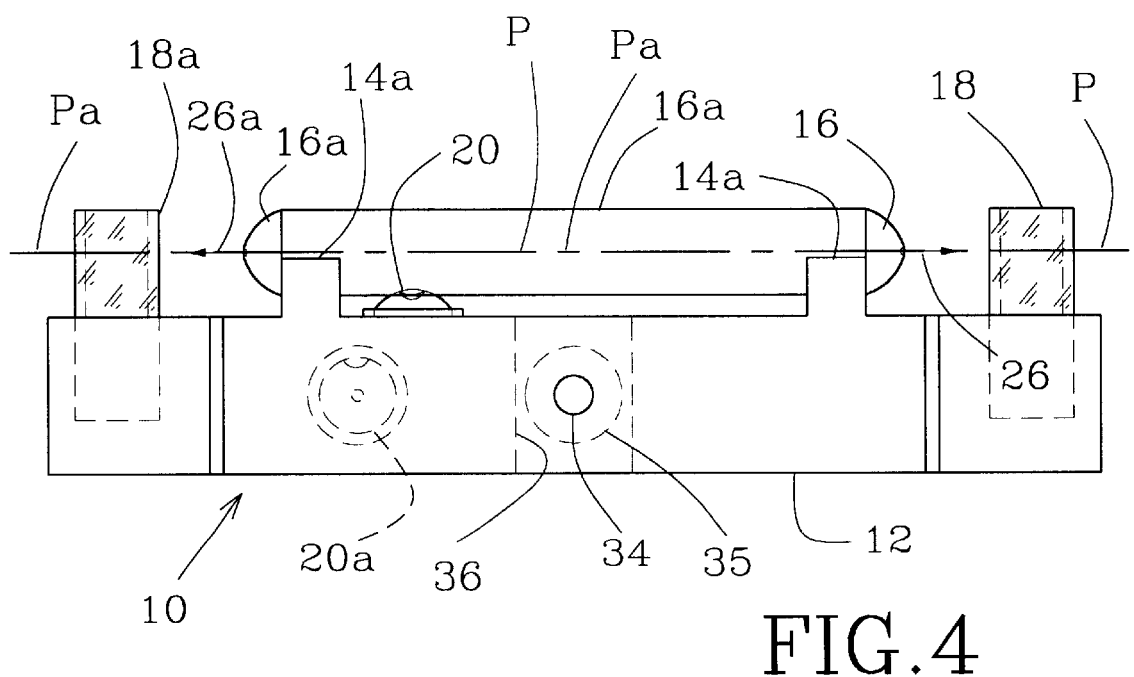
FIG. 4 is a side elevation view of the embodiment of FIG. 1.

As shown on FIGS. 3 and 4, the first line L is in a first radial plane P.

Similarly, the second line La is in a second radial plane Pa essentially coplanar to the first radial plane P due to a proper mounting of both line projectors 21, 21a onto the body member 12. Accordingly, the horizontal plane level 20 is mounted onto the body member 12 so as to align both first and second radial planes P, Pa at the preferred angle of 0 degree such that both first and second radial planes P, Pa indicate a horizontal plane when the line projecting device 10 is properly leveled using its horizontal plane level 20.

Figure 5:
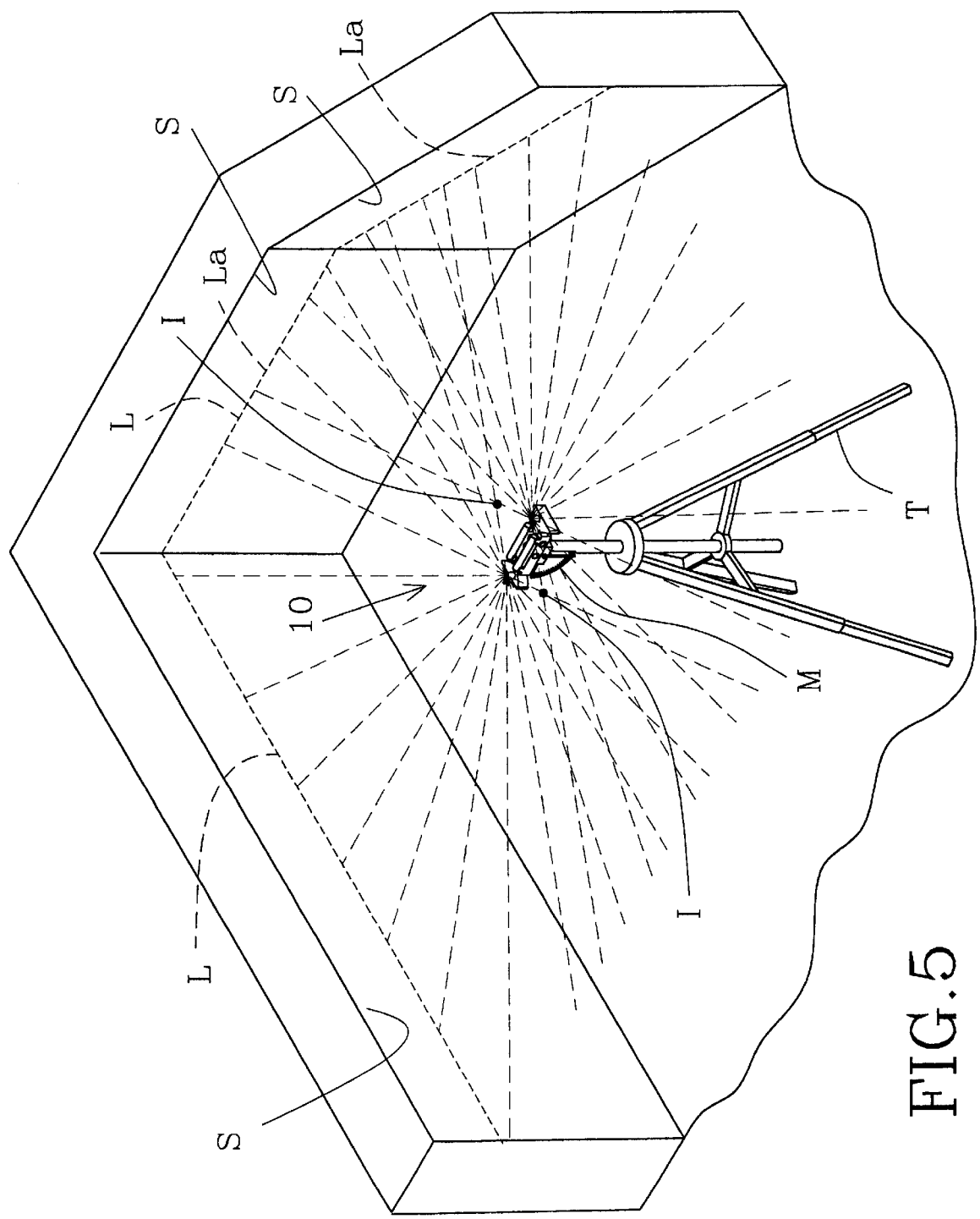
FIG. 5 is a perspective view illustrating the operation of the embodiment of FIG. 1 and the resulting line projected on the walls of the surrounding working and FIG. 6 is a perspective view of the embodiment of FIG. 1 shown mounted on a tripod and adjusted to project a line in a vertically oriented plane.

FIG. 5 shows the line projecting device 10 and a working surface S on which are projected a first line L from the first line projector 21, and a second line La from the second line projector 21a. The combination of these first and second lines L, La from a leveled line projecting device 10 is a horizontal projected line spanning over 360 degrees, and is used as a permanent horizontal reference line on the working surface S as long as the line projecting device 10 remains fixed in that same position.

Figure 6:
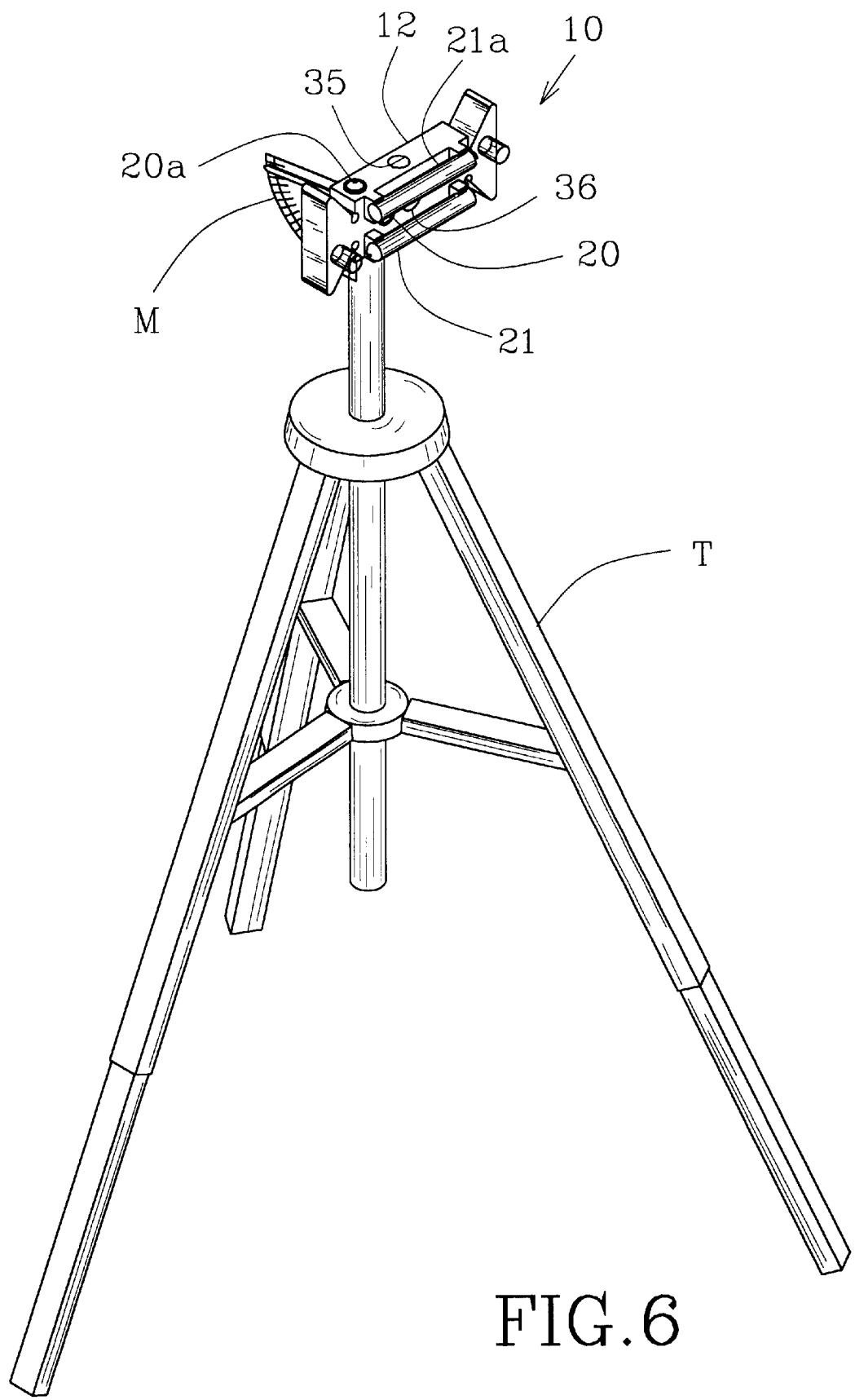

As shown in FIGS. 1 and 6, the line projecting device 10 is preferably provided with different mounting fixtures 34, 35 and 36. These mounting fixtures 34, 35, 36, each properly aligned with respect to the line projectors 21, 21a, are preferably used to mount the body member 12 onto a standard camera tripod T or professional line-surveyor tripod (not shown) respectively. Such a tripod T can be used to level the line projecting device 10 at a horizontal level or at another desired angle (essentially vertical angle shown in FIG. 6) with the use of a tilting mechanism M of the tripod T once the horizontal (and reference) level has been established using the leveling device 20.

It is believed within the reach of one skilled in the art to design a line projecting device (not shown) provided with a body member adapted to receive line projectors on more than one plane to simultaneously generate a plurality of differently oriented projected lines. Similarly, a plurality of line projectors 21, properly mounted on a same surface of a body 12, at equally angularly spaced apart positions around a complete 360 degree within the coplanar radial planes P and with all projected lines L overlapping each adjacent others, form a joint line spanning 360 degrees from the device 10.

Although an embodiment has been described herein with some particularity and details, many modifications and variations of the preferred embodiment are possible without deviating from the scope of the present invention.

I claim:

1. A line projecting device for projecting a line on a working surface comprising:

a partially reflective and partially transparent cylindrical member with an optically smooth outer surface;

a source of collimated light to direct a light beam intersecting said cylindrical member in a radial plane and obliquely to said outer surface, said cylindrical member inducing multiple internal reflections and refractions of said beam on said outer surface for projection of said line onto said working surface, said line spanning over at least 60 degrees from said device;

a body member adapted to fixedly receive said cylindrical member and said light source in proper relative position.

2. A device as defined in claim 1, wherein said cylindrical member further includes an optically smooth inner cylindrical surface generally concentric with said outer surface to form an essentially annular cross-section of said cylindrical member, both said inner and outer surfaces inducing multiple internal reflections and refractions of said beam.

3. A device as defined in claim 2, wherein said line spans over at least 220 degrees from said device.

4. A device as defined in claim 1, wherein said body member is adapted to fixedly receive, in proper relative position a plurality of additional partially reflective and partially transparent cylindrical member with each a respective additional optically smooth outer surface, and a respective additional source of collimated light to direct a respective additional light beam intersecting said respective additional cylindrical member in a respective additional radial plane and obliquely to said respective additional outer surface, said respective additional cylindrical member inducing multiple internal reflections and refractions of said beam on said respective additional outer surface for projection of a respective additional line onto said working surface, said respective additional radial plane being coplanar to said first radial plane, all of said cylindrical members and light sources being generally oriented in generally equally angularly spaced apart positions around a complete 360 degree angle within said radial planes to have all of said lines slightly overlapping each adjacent others and jointly spanning over 360 degrees from said device.

5. A device as defined in claim 1, wherein said body member further includes a leveling device properly aligned with a preferred angle relative to said radial plane.

6. A device as defined in claim 5, wherein said preferred angle is zero so as to orient said line into a horizontal plane when said body member is maintained in a position with said leveling device indicating a horizontal leveling.

7. A device as defined in claim 4, wherein each of said cylindrical members further includes, respectively, an optically smooth inner cylindrical surface generally concentric with said respective outer surface to form an essentially annular cross-section of said respective cylindrical member with both said inner and outer surfaces inducing multiple internal reflections and refractions of said respective beam.

8. A device as defined in claim 4, wherein said body member further includes a leveling device properly aligned with a preferred angle relative to said first and second radial planes.

9. A device as defined in claim 8, wherein said preferred angle is zero so as to orient said first and second lines into a horizontal plane when said body member is maintained in a position with said leveling device indicating a horizontal leveling.

10. A device as defined in claim 1, wherein said body member is adapted to fixedly receive, in proper relative position a second partially reflective and partially transparent cylindrical member with a second optically smooth outer surface, and a second source of collimated light to direct a second light beam intersecting said second cylindrical member in a second radial plane and obliquely to said second outer surface, said second cylindrical member inducing multiple internal reflections and refractions of said beam on said second outer surface for projection of a second line onto said working surface, said second radial plane being coplanar to said first radial plane, said second cylindrical member and second light source being generally oriented 180 degrees from said first cylindrical member and first light source within said radial planes to have said first and second lines, each spanning over at least 220 degrees, slightly overlapping each other and jointly spanning over 360 degrees from said device.

11. A device as defined in claim 10, wherein both said first and second cylindrical members further includes, respectively, a first and second optically smooth inner cylindrical surface generally concentric with said respective outer surface to form an essentially annular cross-section of said respective cylindrical member with both said inner and outer surfaces inducing multiple internal reflections and refractions of said respective beam.

12. A device as defined in claim 11, wherein said body member further includes a leveling device properly aligned with a preferred angle relative to said first and second radial planes.

13. A device as defined in claim 12, wherein said preferred angle is zero so as to orient said first and second lines into a horizontal plane when said body member is maintained in a position with said leveling device indicating a horizontal leveling.

* * * * *